United States Patent
Kim et al.

(10) Patent No.: US 9,732,772 B2
(45) Date of Patent: Aug. 15, 2017

(54) HYBRID SERVO ACTUATOR FOR CRASH TEST

(71) Applicant: Koreatesting Co., Ltd., Daejeon (KR)

(72) Inventors: Hyoung Eui Kim, Daejeon (KR);
Hyoung Joon Kim, Daejeon (KR);
Hyoung Min Kim, Daejeon (KR)

(73) Assignee: Koreatesting Co., Ltd., Daejeon (KR)

( * ) Notice: Subject to any disclaimer, the term of this patent is extended or adjusted under 35 U.S.C. 154(b) by 139 days.

(21) Appl. No.: 14/719,025

(22) Filed: May 21, 2015

(65) Prior Publication Data
US 2016/0041067 A1    Feb. 11, 2016

(30) Foreign Application Priority Data
Aug. 8, 2014 (KR) .......................... 10-2014-0102516

(51) Int. Cl.
*G01M 17/007* (2006.01)
*F15B 15/26* (2006.01)
*F15B 15/22* (2006.01)

(52) U.S. Cl.
CPC .......... *F15B 15/262* (2013.01); *F15B 15/227* (2013.01); *G01M 17/0078* (2013.01)

(58) Field of Classification Search
CPC ........ G01M 7/08; G01M 7/0078; G01M 7/07; G01M 17/0078; G01N 3/30; F15B 15/262; F15B 15/227
See application file for complete search history.

(56) References Cited

U.S. PATENT DOCUMENTS

| | | | | | |
|---|---|---|---|---|---|
| 3,823,600 | A | * | 7/1974 | Wolff | G01N 3/307 73/12.07 |
| 4,930,355 | A | * | 6/1990 | Heck | G01N 3/307 73/837 |
| 5,872,321 | A | * | 2/1999 | Yannaccone | G01M 17/0078 73/12.04 |

(Continued)

FOREIGN PATENT DOCUMENTS

| | | | | |
|---|---|---|---|---|
| EP | 1 750 112 | * | 2/2007 | G01M 17/00 |
| JP | 566084 | | 10/1954 | |

(Continued)

OTHER PUBLICATIONS

Machine translation of EP 1 750 112.*
Machine translation of JP H07 146214.*
Machine translation of JP 2005 024010.*

*Primary Examiner* — Natalie Huls
(74) *Attorney, Agent, or Firm* — The Webb Law Firm

(57) ABSTRACT

Provided is a hybrid servo actuator for a crash test, and more particularly, a hybrid servo actuator for a crash test in which an operating part including a piston and a rod, a chamber supplying an air pressure to the operating part, and a controller controlling a movement of the operating part are integrally formed, thereby increasing a moving speed in a stroke direction of the operating part more than in a general hydraulic cylinder and pneumatic cylinder. The actuator includes an oil pressure cushion type cushion part provided therein to absorb a shock generated by a shock of an operating part even at the time of a malfunction of the operating part and discharge an oil pressure generated by the shock to the outside and thus is used semi-permanently.

9 Claims, 13 Drawing Sheets

(56) References Cited

U.S. PATENT DOCUMENTS

| | | | | |
|---|---|---|---|---|
| 5,929,348 | A * | 7/1999 | Stein | G01M 7/08 73/12.07 |
| 6,039,151 | A * | 3/2000 | Ringel | B66B 5/028 187/207 |
| 6,675,631 | B1 * | 1/2004 | Steffan | G01M 17/0078 73/12.04 |
| 8,453,489 | B2 * | 6/2013 | Moser | G01M 17/0078 73/12.04 |
| 2005/0188744 | A1 * | 9/2005 | Camio | G01M 7/08 73/12.01 |
| 2006/0037381 | A1 * | 2/2006 | Herman | G01M 17/0078 73/37 |
| 2011/0088449 | A1 * | 4/2011 | Powers | G01M 7/08 73/12.09 |
| 2013/0139622 | A1 * | 6/2013 | Park | F16H 25/2454 74/89.32 |
| 2013/0239654 | A1 * | 9/2013 | Kong | G01M 7/08 73/12.09 |
| 2015/0068275 | A1 * | 3/2015 | Beran | G01M 17/0078 73/12.04 |
| 2015/0152896 | A1 * | 6/2015 | Kim | F15B 1/24 91/392 |
| 2015/0159681 | A1 * | 6/2015 | Kajinami | F15B 15/063 92/5 R |
| 2015/0300933 | A1 * | 10/2015 | Jackson | G01M 7/08 73/12.05 |
| 2016/0042669 | A1 * | 2/2016 | Kim | G09B 25/02 434/305 |

FOREIGN PATENT DOCUMENTS

| | | |
|---|---|---|
| JP | 6196203 | 5/1986 |
| JP | 7146214 A | 6/1995 |
| JP | 10197394 A | 7/1998 |
| JP | 2001271801 A | 10/2001 |
| JP | 200524010 A | 1/2005 |
| JP | 2006208094 A | 8/2006 |
| KR | 19910009016 Y1 | 11/1991 |

* cited by examiner (a)

(b)

US 9,732,772 B2

HYBRID SERVO ACTUATOR FOR CRASH TEST

CROSS-REFERENCE TO RELATED APPLICATION

This application claims priority under 35 U.S.C. §119 to Korean Patent Application No. 10-2014-0102516, filed on Aug. 8, 2014, in the Korean Intellectual Property Office, the disclosure of which is incorporated herein by reference in its entirety.

TECHNICAL FIELD

The following disclosure relates to a hybrid servo actuator for a crash test, and more particularly, to a hybrid servo actuator for a crash test which applies an accelerating force to a targeted object in the crash test of a vehicle.

BACKGROUND

To test safety of a vehicle, automobile companies and research institutes perform a safety test. In particular, researches for minimizing bad effects on passengers by simulating situations occurring due to a crash accident of a vehicle in advance have been conducted.

As a plan of the research, a crash test process for testing how passengers are affected at the time of the occurrence of a safety accident is essentially performed when car makers develop new cars.

In the crash test process, a dummy is placed inside a vehicle which is an object of a crash test and then the vehicle collides with a crash member, and the like at various speeds, and as a result a shock applied to the dummy is measured by a meter such as a sensor or is photographed as an image to be analyzed.

However, the crash test process is accompanied by a long preparation process due to the preparation of a plurality of actual vehicles meeting speed conditions for testing, the preparation of dummies meeting conditions in vehicles, and the like and therefore is quite expensive to use vehicles for the tests, in addition to a long investment period. As a result, the crash test process may cause temporal and human losses.

To solve the above problem, a crash test of a vehicle is performed under the same environment as the actual accident by installing an accelerated actuator for test in the vehicle and applying an accelerating force generated by a pressure fluid to a tested vehicle or a tested object meeting conditions through a piston and a rod within the actuator.

U.S. Pat. No. 8,453,489 (Registered on Jun. 4, 2013 entitled "Method and System for Concluding Crash Tests") proposed a method and a system for performing a crash test applying a shock to a targeted object by operating a piston and a rod by a pressure fluid.

The actuator used for the above-mentioned crash test and the general crash test includes a shock absorbing apparatus to prevent an internal shock between the piston and a body of the actuator occurring due to a malfunction of the actuator during the crash test.

The general shock absorbing apparatus having elasticity is included in the actuator and therefore the actuator in which the piston and the rod are progressed in a stroke direction at a rapid speed is hard to absorb a shock and the actuator and the shock absorbing apparatus are applied with a pressure generated by the shock and are thus likely to be damaged.

As another method, there is a method for absorbing a shock generated by a malfunction using a crush tube, etc.

However, the crush tube is a disposable product and therefore the crush tube is dented by a shock needs to be replaced, which leads to a problem in that additional costs and maintenance time are required every time the crush tube is replaced.

RELATED ART DOCUMENT

Patent Document

U.S. Pat. No. 8,453,489 (Registered on Jun. 4, 2013 entitled "Method and System for Concluding Crash Tests").

SUMMARY

An embodiment of the present invention is directed to providing a hybrid servo actuator for a crash test, in which the actuator used for the crash test is integrally formed with an operating part including a piston and a rod, a chamber supplying a high air pressure (350 bar) to the operating part, and a controller controlling a movement of the operating part, thereby more increasing a moving speed in a stroke direction of the operating part than a general hydraulic cylinder and pneumatic cylinder.

Another embodiment of the present invention is directed to providing a hybrid servo actuator for a crash test, in which the actuator used for the crash test may include an oil pressure cushion type cushion part provided therein to absorb a shock generated by a shock of an operating part even at the time of a malfunction of the operating part and discharge an oil pressure generated by the shock to the outside and may be used semi-permanently, thereby preventing financial and temporal losses.

Still another embodiment of the present invention is directed to providing a hybrid servo actuator for a crash test, in which a controller for controlling a movement of the operating part is formed at a selected position and performs a control using a servo-valve, thereby smoothing braking of the operating part moving at a rapid speed.

Yet another embodiment of the present invention is directed to providing a hybrid servo actuator for a crash test capable of smoothing a control of an operating part moving at a more rapid speed than a hydraulic braking method by braking the movement of the operating part based on a method for contacting a control pad of a controller with a rod.

Still yet another embodiment of the present invention is directed to providing a hybrid servo actuator for a crash test, in which a piston of an operating part is formed as an aero dynamic bearing to prevent a direct friction even at the time of a movement of the operating part in a stroke direction, thereby reducing a friction force and increasing a wear resistance.

In one general aspect, a hybrid servo actuator for a crash test as a stroke driving actuator including a body and a means, includes: an operating part configured to include a piston which is provided to move in a hollow formed in a stroke direction inside the body and a rod which is connected to the piston to protrude in one direction of the body; a chamber configured to be formed at the other side of the body and supply an air pressure to the operating part; and a controller configured to be formed at one side of the body to enclose the hollow and control a movement of the operating part.

The controller may include: a control pad configured to be formed to contact an outer circumferential surface of the rod and control an operation of the operating part; a fixed controller configured to be formed at one side of the control pad and fix the control pad by an oil pressure; an operation controller configured to be formed at the other side of the control pad and control an operation of the control pad by the oil pressure; and a braking release controller configured to supply the oil pressure to control an operation of the controller.

The braking release controller may supply an oil pressure larger than that of the fixed controller to the operation controller to release the control pad from the rod.

The fixed controller may have a spring shape and fix the control pad by elasticity.

The braking release controller may supply the oil pressure larger than the elasticity of the fixed controller to the operation controller to release the control pad from the rod.

The hybrid servo actuator may further include: a reverse pneumatic supplier configured to be formed at an end in a stroke advancing direction of the piston to supply an air pressure to the hollow.

The hybrid servo actuator may further include: a cushion part configured to be formed on a front surface of the controller in the stroke direction of the piston to absorb a shock of the piston.

The cushion part may include: a cushion piston configured to prevent the piston from being advanced in the stroke direction; and a cushion valve configured to be connected to the cushion piston to discharge the oil pressure to the outside.

The piston may include at least one O-ring configured to be formed on an outer circumferential surface of the piston in a circumferential direction.

The piston may be an aero dynamic bearing and the aero dynamic bearing may include a bearing body configured to include a bearing hollow formed to enclose the rod; a plurality of air grooves configured to be formed on an outer circumferential surface of the bearing body in a circumferential direction; a plurality of air holes configured to be formed on one side of the bearing body; and a guide pipe configured to guide the air pressure introduced into the air hole to the air groove.

The operating part may further include an accelerator measurement sensor configured to be formed at an end of the rod.

Other features and aspects will be apparent from the following detailed description, the drawings, and the claims.

DETAILED DESCRIPTION OF MAIN ELEMENTS

Figure 1:
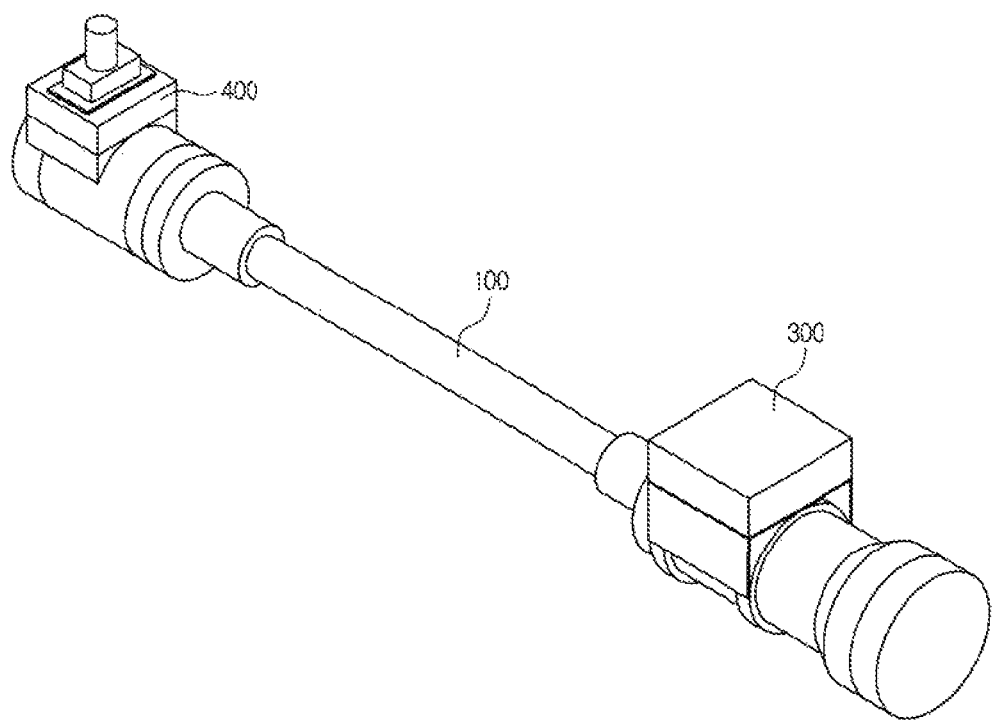
FIG. 1 is a diagram illustrating a hybrid servo actuator for a crash test according to an exemplary embodiment of the present invention.

1000: Hybrid servo actuator for crash test
100: Body
110: Hollow
200: Operating part
210: Piston
211: Bearing body
212: Bearing hollow
213: Air groove
214: Air hole
215: Guide pipe
220: Rod
300: Chamber
310: Compressed air supplier
400: Controller
410: Control pad
420: Fixed controller
430: Operation controller
440: Braking release controller
500: Reverse pneumatic supplier
600: Cushion part
610: Cushion piston
620: Cushion valve
700: Accelerator measurement sensor
1: Hydraulic supplier
2: Reverse pneumatic storage part
3: Pneumatic safety part

DETAILED DESCRIPTION OF EMBODIMENTS

Hereinafter, a hybrid servo actuator for a crash test according to an exemplary embodiment of the present invention having the above-mentioned characteristics will be described in more detail with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

A hybrid servo actuator 1000 for a crash test according to an exemplary embodiment of the present invention is an actuator used for a crash test of a vehicle and as illustrated in FIGS. 1 to 5, the hybrid servo actuator 1000 for a crash test according to the exemplary embodiment of the present invention is a stroke driving actuator including a body 100 and a means and is configured to largely include an operating part 200, a chamber 300, and a controller 400.

The operating part 200 includes a piston 210 which is provided to move in a hollow 110 formed in a stroke direction inside the body 100 and a rod 220 which is connected to the piston 210 to protrude in one direction of the body 100.

The operating part 200 is similar to the piston and the rod which are provided in a general actuator, cylinder, or the like and therefore a detailed description of a structure thereof will be omitted.

The chamber 300 includes a compressed air supplier 310 which is supplied with compressed air and uses the compressed air supplied from the compression air supplier 310 to supply air pressure to the operating part 200 so that the piston 210 and the rod 220 of the operating part 200 may move in the stroke direction.

The controller 400 is formed to control the movement of the operating part 200 using an oil pressure and a fixed controller 420 and is formed at one side of the body 100.

That is, the hybrid servo actuator 1000 for a crash test according to the exemplary embodiment of the present invention has a structure in which the chamber 300, the operating part 200, and the controller 400 are integrally formed.

In particular, since the operating part 200 and the chamber 300 are integrally formed and thus a delivery length of the air pressure supplied from the chamber 300 is short, the hybrid servo actuator 1000 for a crash test according to the exemplary embodiment of the present invention may supply a higher air pressure (350 bar) to the operating part 200 than the existing actuator without losing according to the moving distance and may supply the high air pressure to the operating part 200 to move the operating part 200 in the stroke direction at a more rapid speed than the existing actuator.

That is, for the crash test of the vehicle, the piston 210 and the rod 220 of the operating part 200 need to move in the stroke direction at a rapid speed. For this purpose, according to the exemplary embodiment of the present invention, the operating part 200, the chamber 300, and the controller 400 are integrally formed, and thus test conditions similar to the actual crash of the vehicle may be reproduced.

Further, in the hybrid servo actuator 1000 for a crash test according to the exemplary embodiment of the present invention, since the operating part 200 moves at a very rapid speed, the controller 400 which controls the movement of the operating part 200 needs to be formed to control the movement of the operating part 200 moving at a rapid speed.

Therefore, unlike the existing actuator performing the braking only by the general oil pressure or air pressure, the controller 400 of the hybrid servo actuator 1000 for a crash test according to the exemplary embodiment of the present invention is configured to largely include a control pad 410, a fixed controller 420, an operation controller 430, and a braking release controller 440 and controls the operation of the controller 400 using the oil pressure.

Figure 4:
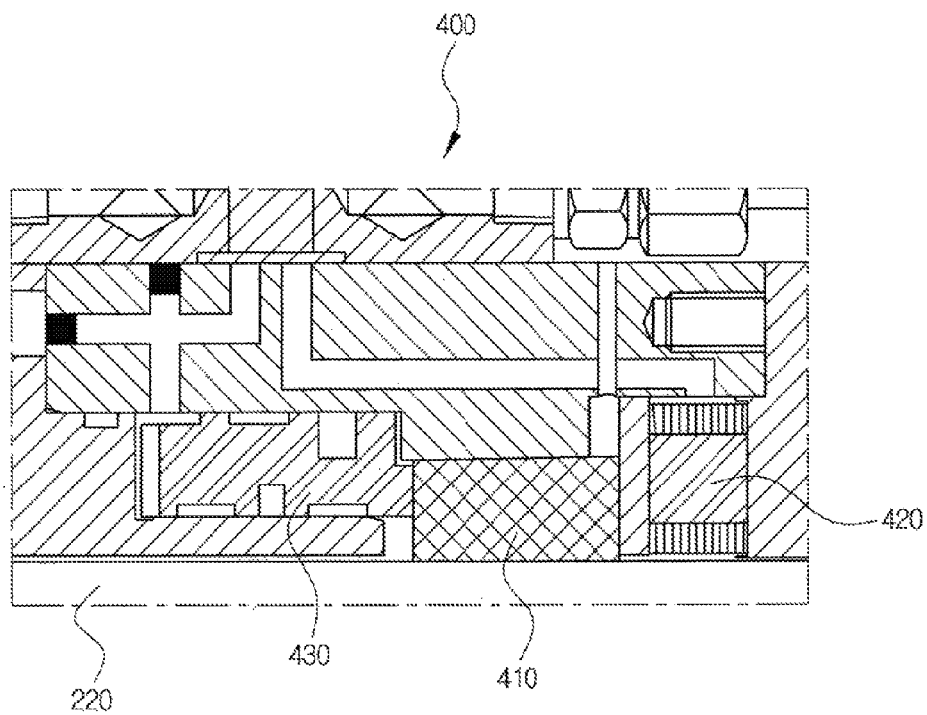
FIG. 4 is an enlarged view of a controller of the hybrid servo actuator for a crash test according to the exemplary embodiment of the present invention.
Figure 13:
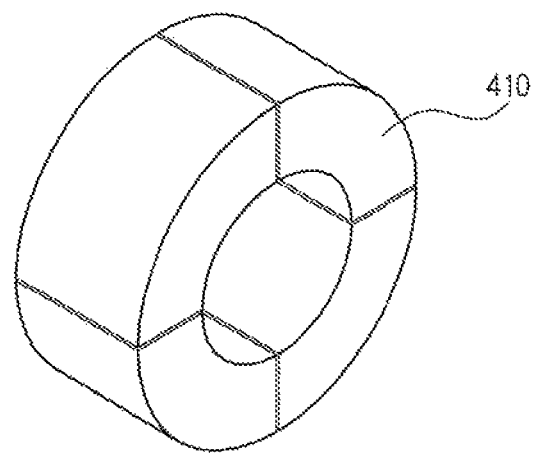
FIGS. 13a-b are perspective views illustrating a controller of the hybrid servo actuator for a crash test according to the exemplary embodiment of the present invention.
Figure 13:
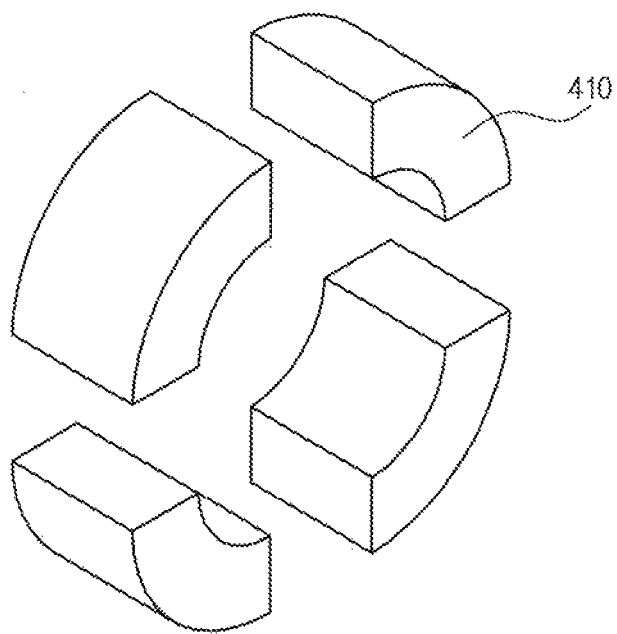
Figure 14:
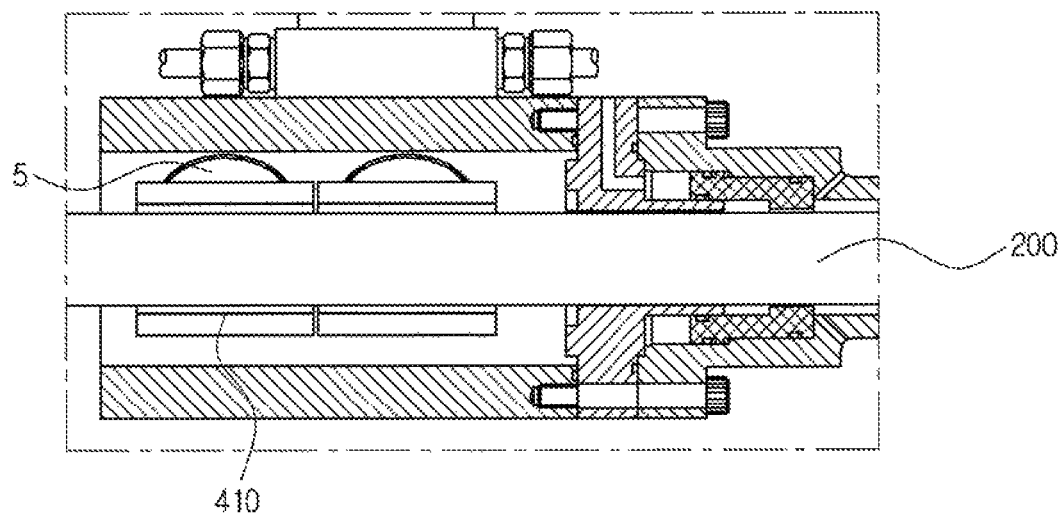
FIG. 14 is a diagram illustrating another scheme of a controller of the hybrid servo actuator for a crash test according to the exemplary embodiment of the present invention.

Describing in more detail the controller 400, as illustrated in FIG. 4 or 13, the control pad 410 is formed to contact an outer circumferential surface of the rod 220 to serve to constrain the movement of the operating part 200, which is based on a principle similar to a braking principle of a brake pad (brake disk) of the vehicle.

Further, the control pad 410 preferably has a wedge shape to contact the rod 220 to brake the rod 220 or release the rod 220, but is not limited to the wedge shape.

Further, three to five control pads 410 are recommended to contact the outer circumferential surface of the rod but the number of control pads 410 is not limited thereto.

In this case, the control pad 410 is formed to contact the rod 220 by the fixed controller 420 formed at one side of the control pad 410, in which the fixed controller 420 is supplied with an oil pressure from the braking release controller 440 to fix the control pad 410 using the oil pressure so that the control pad 410 contacts the rod 220 to constrain the rod 220.

The operation controller 430 is formed at the other side of the control pad 410 which is a position opposite to the fixed controller 420 based on the control pad 410 and the operation controller 430 also controls the operation of the control pad 410 using the oil pressure.

In this case, the operation of the control pad 410 means an operation of allowing the control pad 410 to brake the rod 220 and to be released from the rod 220 by contacting the control pad 410 with the rod 220 not to brake the rod 220.

The braking release controller 440 supplies or stops an oil pressure to the fixed controller 420 and the operation controller 430 to control the operation of the controller 400 and is preferably configured of a servo valve, etc., to perform an automatic control but is not limited to the servo valve.

The operation of the controller 400 by the control of the braking release controller 440 will be described in detail.

Figure 2:
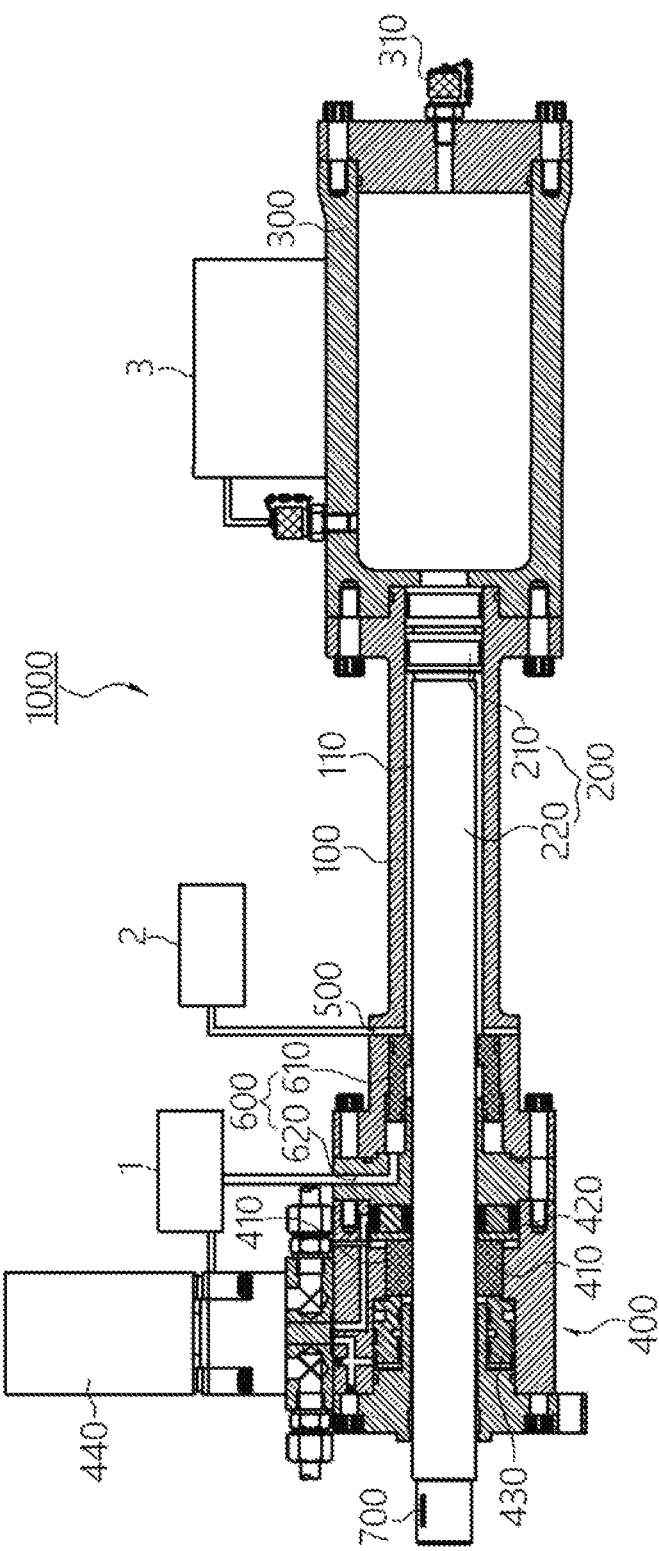
FIG. 2 is a cross-sectional view illustrating the hybrid servo actuator for a crash test according to the exemplary embodiment of the present invention.
Figure 3:
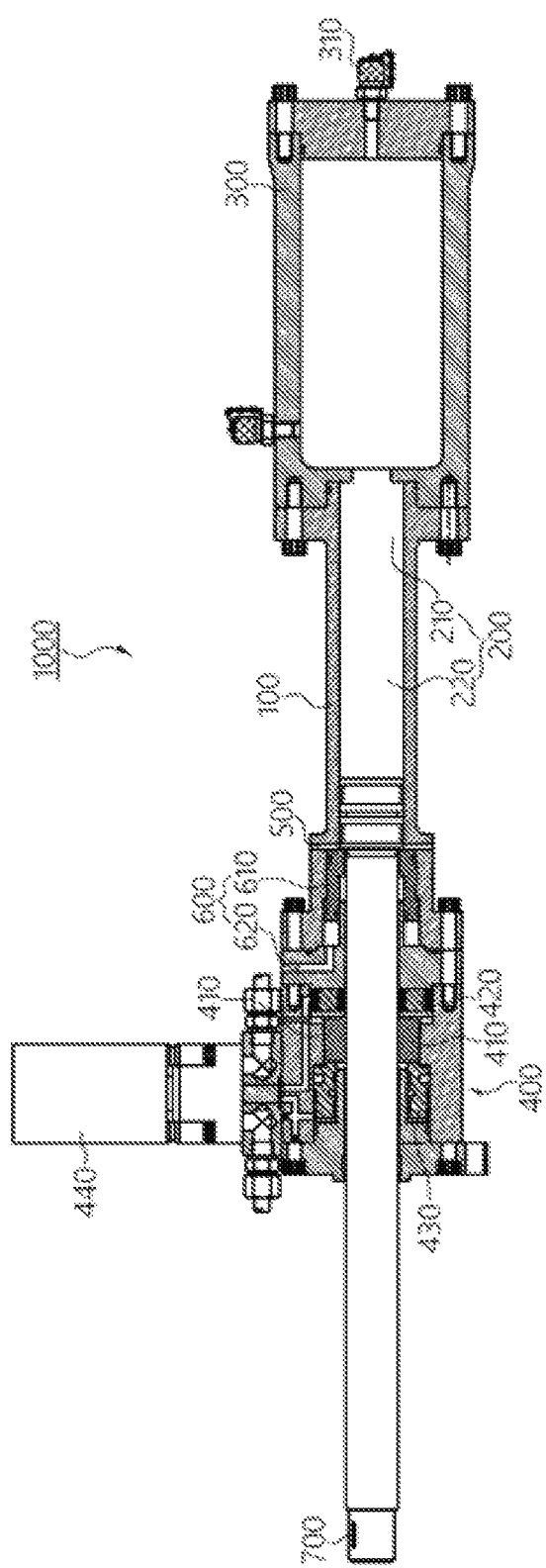
FIG. 3 is another cross-sectional view illustrating the hybrid servo actuator for a crash test according to the exemplary embodiment of the present invention.

FIG. 2 is a diagram illustrating the state in which the operating part 200 of the hybrid servo actuator 1000 for a crash test according to the exemplary embodiment of the present invention brakes and FIG. 3 is a diagram illustrating the state in which the operating part 200 of the hybrid servo actuator 1000 for a crash test according to the exemplary embodiment of the present invention does not brake and moves in the stroke direction.

As illustrated in FIG. 2, the control pad 410 is fixed at both sides by the fixed controller 420 and the operation controller 430 based on the oil pressure supplied from the braking release controller 440 and the fixed control pad 410 is fixed by contacting the rod 220 to brake the movement of the operating part 200.

Figure 5:
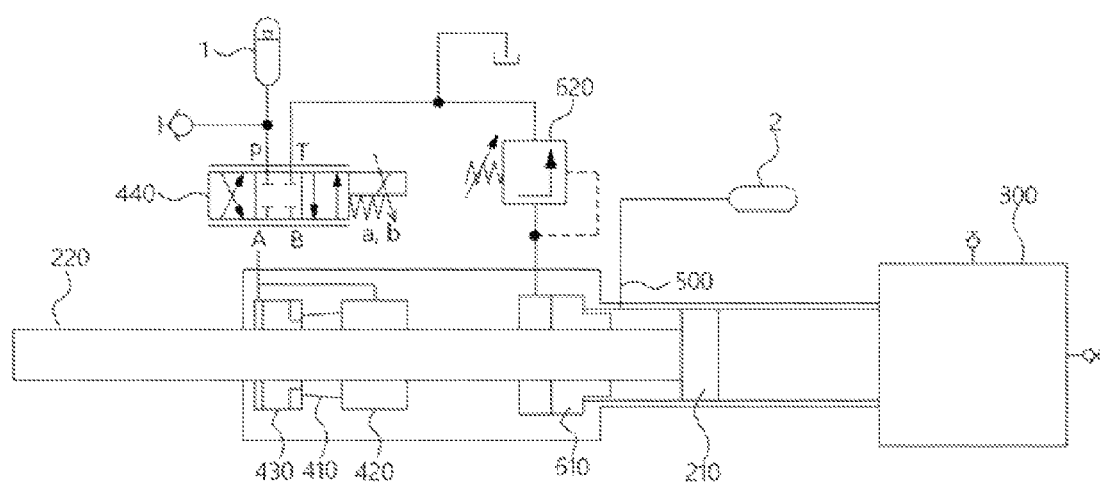
FIG. 5 is a diagram illustrating a driving circuit of the hybrid servo actuator for a crash test according to the exemplary embodiment of the present invention.

In this case, as illustrated in FIG. 5, to operate the operating part 200 of the hybrid servo actuator 1000 for a crash test according to the exemplary embodiment of the present invention, the braking release controller 440 supplies the oil pressure larger than that of the fixed controller 420 to the operation controller 430 and the operation controller 430 pushes the control pad 410 in the direction of the fixed controller 420 using the oil pressure to allow the control pad 410 to separate from the rod 220 so as to release the rod 220.

That is, the braking release controller 440 supplies the oil pressure larger than that of the fixed controller 420 to the operation controller 430 to separate the control pad 410 from the rod 220 so as to release the rod 220.

As described above, to release the rod 220 from the control pad 410, the braking release controller 440 may not supply the oil pressure to the fixed controller 420 or supply a larger oil pressure to the operation controller 430 to perform a control.

After the operation, when the operating part 200 is advanced in the stroke direction by the air pressure supplied from the chamber 300 and moves as much as a moving distance of the operating part 200, the braking release controller 440 recovers the oil pressure supplied to the operation controller 230 to balance the oil pressure or increase the oil pressure supplied to the fixed controller 420, such that a force by the oil pressure of the operation controller 430 and the fixed controller 420 contacts the control pad 410 with the rod 220 to brake the rod 220.

Further, in the hybrid servo actuator 1000 for a crash test according to the exemplary embodiment of the present invention, an end in a stroke advancing direction of the operating part 200 may be further provided with a reverse pneumatic supplier 500 supplying an air pressure to the hollow 110.

That is, the controller 400 does not brake the operating part 200, and at the same time, advances the operating part 200 in the stroke direction by the air pressure of the chamber 300, the controller 400 advances the operating part 200 by a predetermined distance and then brakes the operating part 200, and the controller 400 does not brake the operating part 200 and reverses the operating part 200 in the stroke direction by the air pressure supplied to the reverse pneumatic supplier 500 when the operating part 200 reverses in the stroke direction.

In this case, the controller 400 may include a reverse pneumatic storage part 2 which supplies the air pressure to the reverse pneumatic supplier 500 but is not limited thereto and therefore a method for reversing the operating part 200 in the stroke direction may be possible.

Further, as illustrated in FIGS. 2 and 3, the hybrid servo actuator 1000 for a crash test according to the exemplary embodiment of the present invention may be configured to include the hydraulic supplier 1 which supplies an oil pressure to the braking release controller 440.

To rapidly supply an oil pressure to the braking release controller 440, the hydraulic suppliers 1 are preferably provided on sides or an upper portion of the hybrid servo actuator 1000 for a crash test according to the exemplary embodiment of the present invention but may be separately provided according to the place and environment in which the actuator is installed and be connected to each other by a pipe to be used in the operation of the actuator.

The hybrid servo actuator 1000 for a crash test according to the exemplary embodiment of the present invention may be formed to include pneumatic safety parts 3 which are provided at an upper portion or sides of the chamber 300 to maintain the air pressure in the chamber 300 at a proper level, along with the hydraulic supplier 1.

The pneumatic safety part 3 may use a safety valve to maintain the air pressure in the chamber 300 at a proper level to prevent an overpressure which is likely to be damaged to the apparatus or a small pressure which may not operate the operating part 200, thereby effectively operating the actuator and preventing a safety accident.

As illustrated in FIG. 3, in the hybrid servo actuator 1000 for a crash test according to the exemplary embodiment of the present invention, a front surface of the controller 400 in the stroke direction of the piston 210 is further provided with a cushion part 600 which absorbs the shock of the piston 210.

The cushion part 600 includes a cushion piston 610 which prevents the piston 210 from being advanced in the stroke direction and a cushion valve 620 which is configured to be connected to the cushion piston 610 to discharge an oil pressure generated at the time of the shock of the piston 210 with the cushion piston 610 to the outside.

That is, the cushion part 600 serves to absorb the shock generated at the time of the shock of the piston 200 with a portion of the body 100 due to the increase in the braking distance of the operating part 200 by an inertial force or the malfunction of the operating part 200, when the operating part 200 moves in the stroke direction.

In this case, the cushion part 600 discharges the oil pressure generated at the time of the shock with the piston 210 to the outside through the above-mentioned cushion valve 620 to absorb the shock by the piston 210 and discharge the oil pressure generated by the shock to the outside, and thus may be used semi-permanently.

Unlike the existing disposable cushion apparatus, the cushion part 600 may be used semi-permanently, thereby preventing financial and temporal losses.

In this case, various recovery embodiments such as again recovering the oil pressure discharged to the outside through the cushion valve 620 to the above-mentioned hydraulic supplier 1 or allowing another apparatuses to recover the oil pressure may be possible.

Further, the cushion piston 610 is preferably made of a flexible material to absorb the shock with the piston but a material of the cushion piston 610 for shock absorption may be various.

<First Example of the Hybrid Servo Actuator 1000 for a Crash Test According to the Exemplary Embodiment of the Present Invention>

Figure 6:
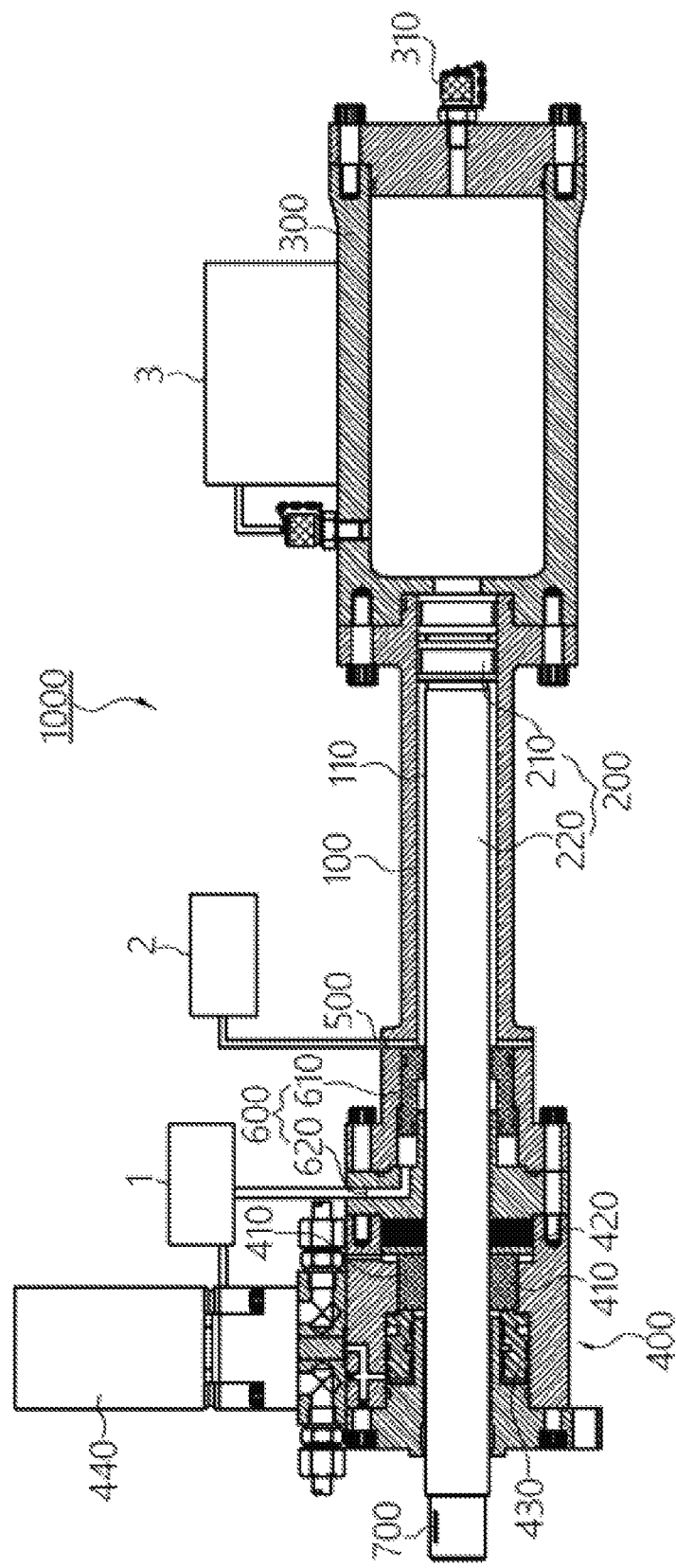
FIG. 6 is a diagram illustrating a first example of a hybrid servo actuator for a crash test according to the exemplary embodiment of the present invention.
Figure 7:
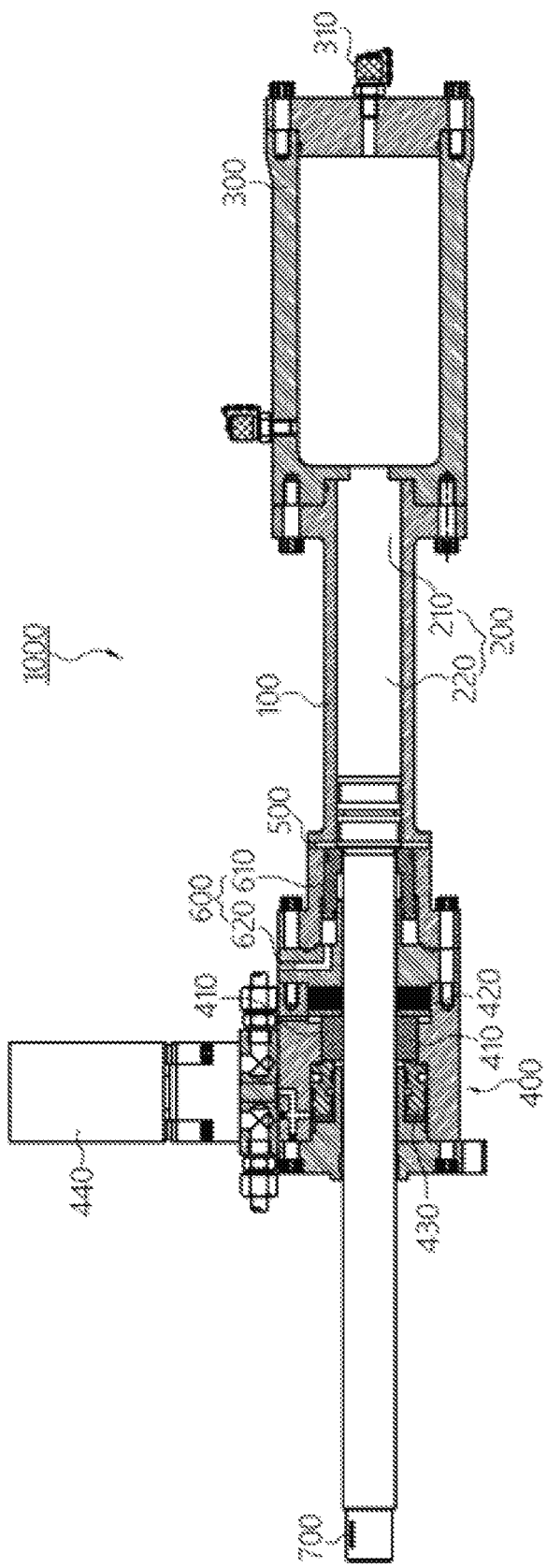
FIG. 7 is another diagram illustrating the first example of the hybrid servo actuator for a crash test according to the exemplary embodiment of the present invention.
Figure 8:
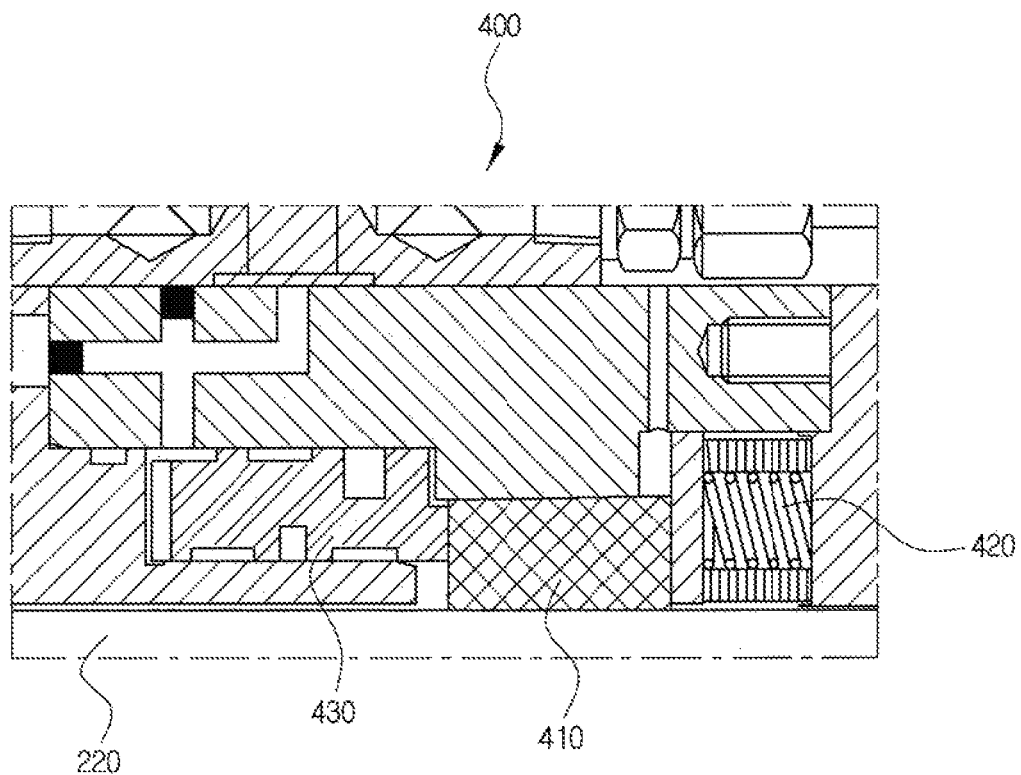
FIG. 8 is an enlarged view of a controller of the first example of the hybrid servo actuator for a crash test according to the exemplary embodiment of the present invention.

In the controller 400 of the hybrid servo actuator 1000 for a crash test according to the exemplary embodiment of the present invention, as illustrated in FIGS. 6 to 8, the fixed controller 420 may have a spring shape to fix the control pad 410 by elasticity, not by the oil pressure.

That is, the controller 400 of the first example of the hybrid servo actuator 1000 for a crash test according to the exemplary embodiment of the present invention allows the braking release controller 440 to supply the oil pressure larger than the elasticity of the fixed controller 420 to the operation controller 430 so as to release the control pad 410 from the rod 220.

In other words, as illustrated in FIG. 6, the control pad 410 of the first example of the hybrid servo actuator 1000 for a crash test according to the exemplary embodiment of the present invention is fixed while contacting the rod 220 by the elastic force of the spring-shaped fixed controller 420 and the operation controller 430 fixed to the other side to brake the movement of the operating part 200.

On the other hand, as illustrated in FIG. 7, to move the operating part 200 of the hybrid servo actuator 1000 for a crash test according to the exemplary embodiment of the present invention, the braking release controller 440 supplies the oil pressure to the operation controller 430 and the operation controller 430 pushes the control pad 410 in the direction of the spring-shaped fixed controller 420 using the oil pressure to allow the control pad 410 to separate from the rod 220 so as to release the rod 220.

That is, the braking release controller 440 supplies the oil pressure larger than elasticity of the spring-shaped fixed controller 420 to the operation controller 430 to separate the control pad 410 from the rod 220 so as to release the rod 220.

Further, the fixed controller 420 of the hybrid servo actuator 1000 for a crash test according to the exemplary embodiment of the present invention is not limited to the above-mentioned spring shape and the fixed controller 420 of the hybrid servo actuator 1000 for a crash test is not limited to a spring material or the spring shape but may be variously formed as long as they are made of a material having elasticity enough to release the control pad 410 by applying a force to fix the control pad 410 and the oil pressure to the operation controller 430.

In this case, the controller 400 of the hybrid servo actuator 1000 for a crash test according to the exemplary embodiment of the present invention may perform various control examples such as the above-mentioned method and the method of forming the controller 400 as a hydraulic piston type to allow the control pad 410 to operate the piston using the oil pressure so as to brake or separate the rod 220, as the method of separating the control pad 410 from the rod 220 or braking the rod pad 220.

Further, the hybrid servo actuator 1000 for a crash test according to the exemplary embodiment of the present invention may include at least one O-ring (not illustrated) which is formed on the outer circumferential surface of the piston 210 in a circumferential direction.

The O-ring seals the front and rear surfaces of the piston 210 to increase sealability of the hollow 110 inside the body 100, thereby maintaining the air pressure supplied to move the operating part 200.

<Second Example of the Hybrid Servo Actuator 1000 for a Crash Test According to the Exemplary Embodiment of the Present Invention>

Figure 9:
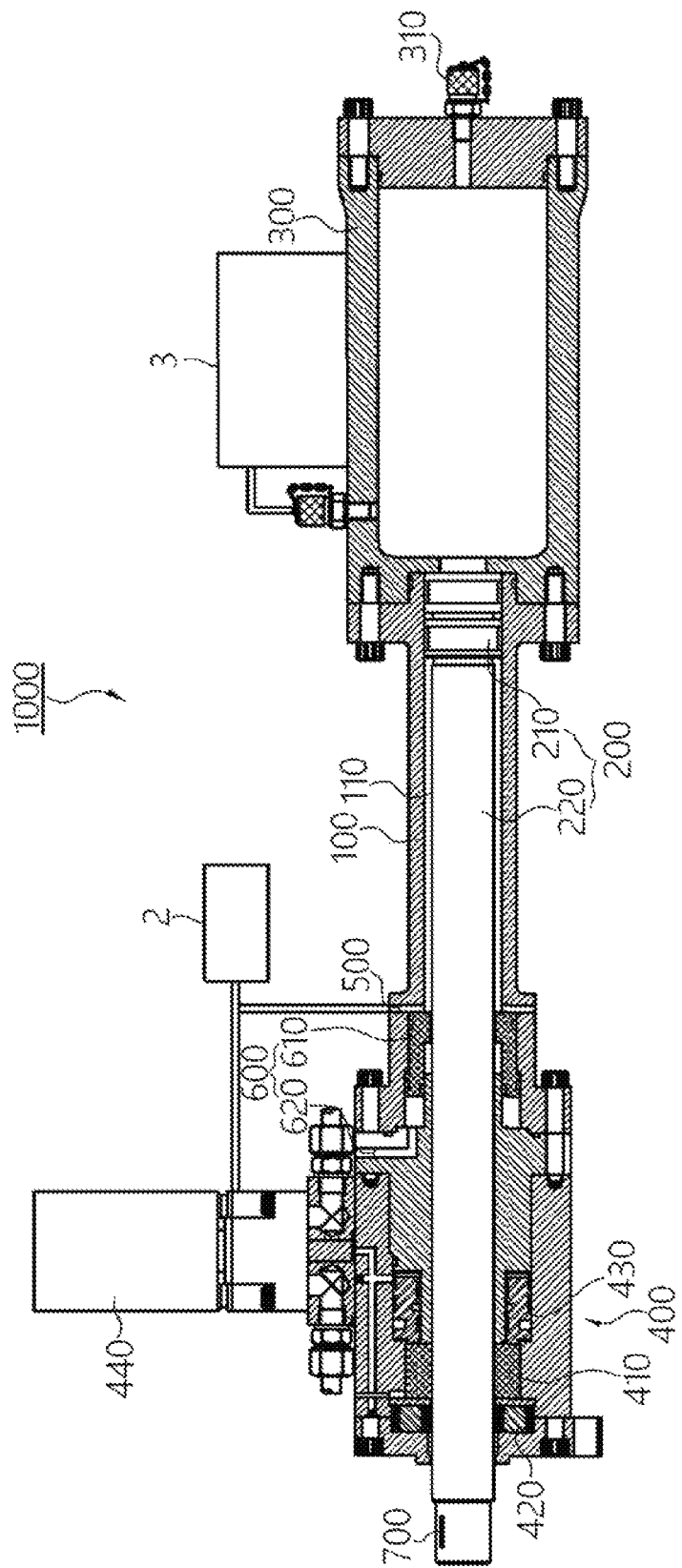
FIG. 9 is a diagram illustrating a second example of the hybrid servo actuator for a crash test according to the exemplary embodiment of the present invention.

FIG. 9 is a diagram illustrating an example of the controller 400 of the hybrid servo actuator 1000 for a crash test according to the exemplary embodiment of the present invention.

As illustrated in FIG. 9, the fixed controller 420 and the operation controller 430 of the controller 400 may be formed by changing the positions thereof.

The fixed controller 420 and the operation controller 430 may be formed at various positions according to the crash test environment and when the fixed controller 420 is formed as the spring shape according to the first example of the hybrid servo actuator 1000 for a crash test according to the exemplary embodiment of the present invention, the spring-shaped fixed controller 420 is provided to be close to an outside direction of the body 100, such that the spring-shaped fixed controller 420 may be easily replaced or repaired.

<Third Example of the Hybrid Servo Actuator 1000 for a Crash Test According to the Exemplary Embodiment of the Present Invention>

Figure 10:
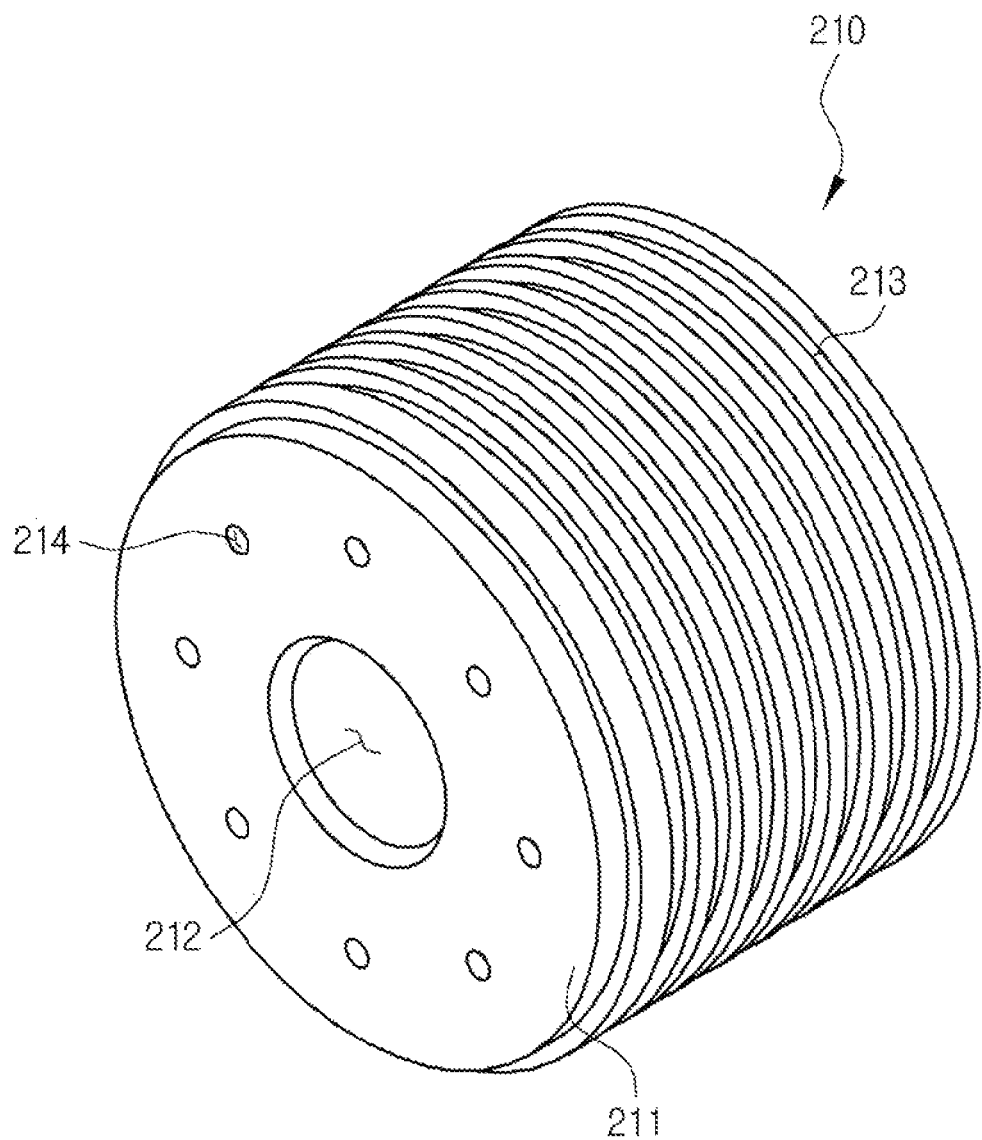
FIG. 10 is a diagram illustrating a third example of the hybrid servo actuator for a crash test according to the exemplary embodiment of the present invention.
Figure 11:
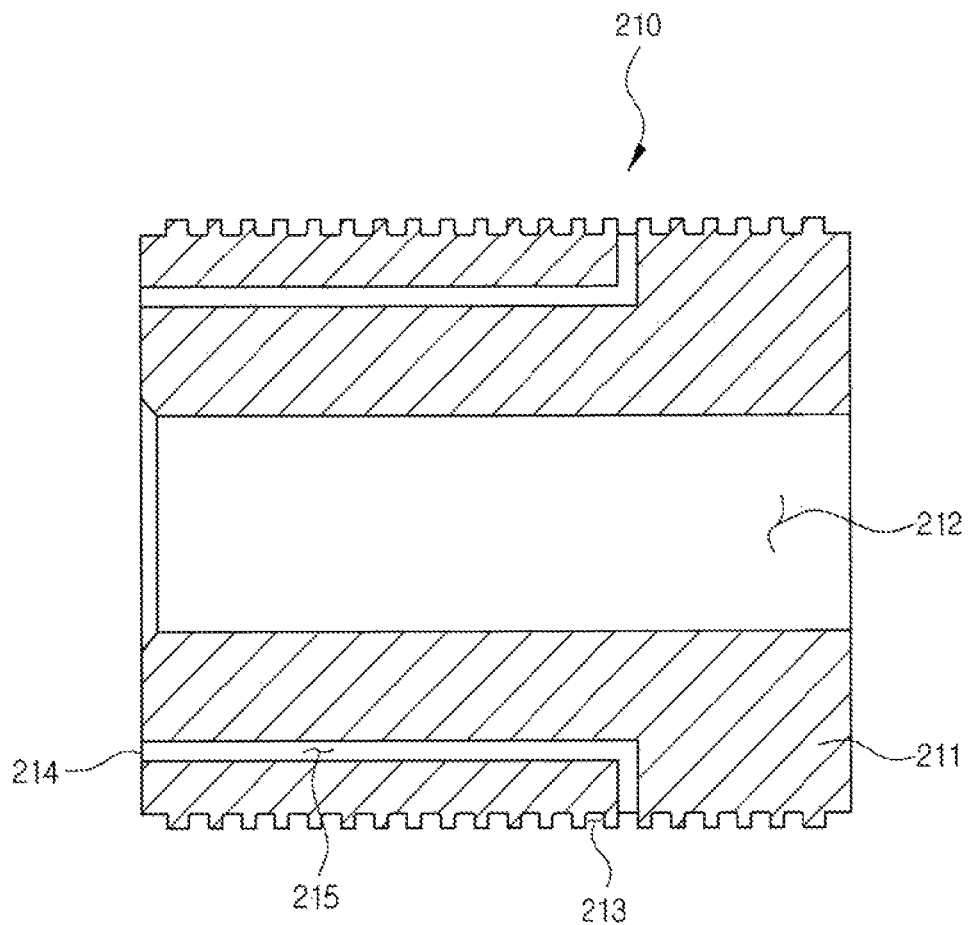
FIG. 11 is another diagram illustrating the third example of the hybrid servo actuator for a crash test according to the exemplary embodiment of the present invention.

As illustrated in FIGS. 10 and 11, the piston 210 of the hybrid servo actuator 1000 for a crash test according to the exemplary embodiment of the present invention may be formed as an aero dynamic bearing.

The aero dynamic bearing includes a bearing body 211 including a bearing hollow 212 formed to enclose the rod 220 and a plurality of air grooves 213 which are formed on an outer circumferential surface of the bearing body 211 in a circumferential direction.

Further, the aero dynamic bearing includes a plurality of air holes 214 which are formed on one side of the bearing body 211 and a guide pipe 215 which guides the air pressure introduced into the air hole 214 to the air groove 211.

That is, the piston 210 of the hybrid servo actuator 1000 for a crash test according to the exemplary embodiment of the present invention is formed as the aero dynamic bearing to form an aero dynamic bearing film in the air groove 213 of the outer surface of the piston 210, and therefore may be operated without the direct friction with the body 100.

In other words, the piston 210 may move in the stroke direction without the direct friction with the body 100, and as a result, has advantages of the reduced friction force, the increased lifespan, and the strong wear resistance and the operating part 200 may move at a high speed due to the reduced friction force.

<Fourth Example of the Hybrid Servo Actuator 1000 for a Crash Test According to the Exemplary Embodiment of the Present Invention>

The hybrid servo actuator 1000 for a crash test according to the exemplary embodiment of the present invention preferably has the structure in which the body 100, the operating part 200, and the chamber 300 are integrally formed as described above.

However, the chamber 300 of the hybrid servo actuator 1000 for a crash test according to the exemplary embodiment of the present invention may also be separately formed according to the size and the structure of the space in which the crash test is performed.

Figure 12:
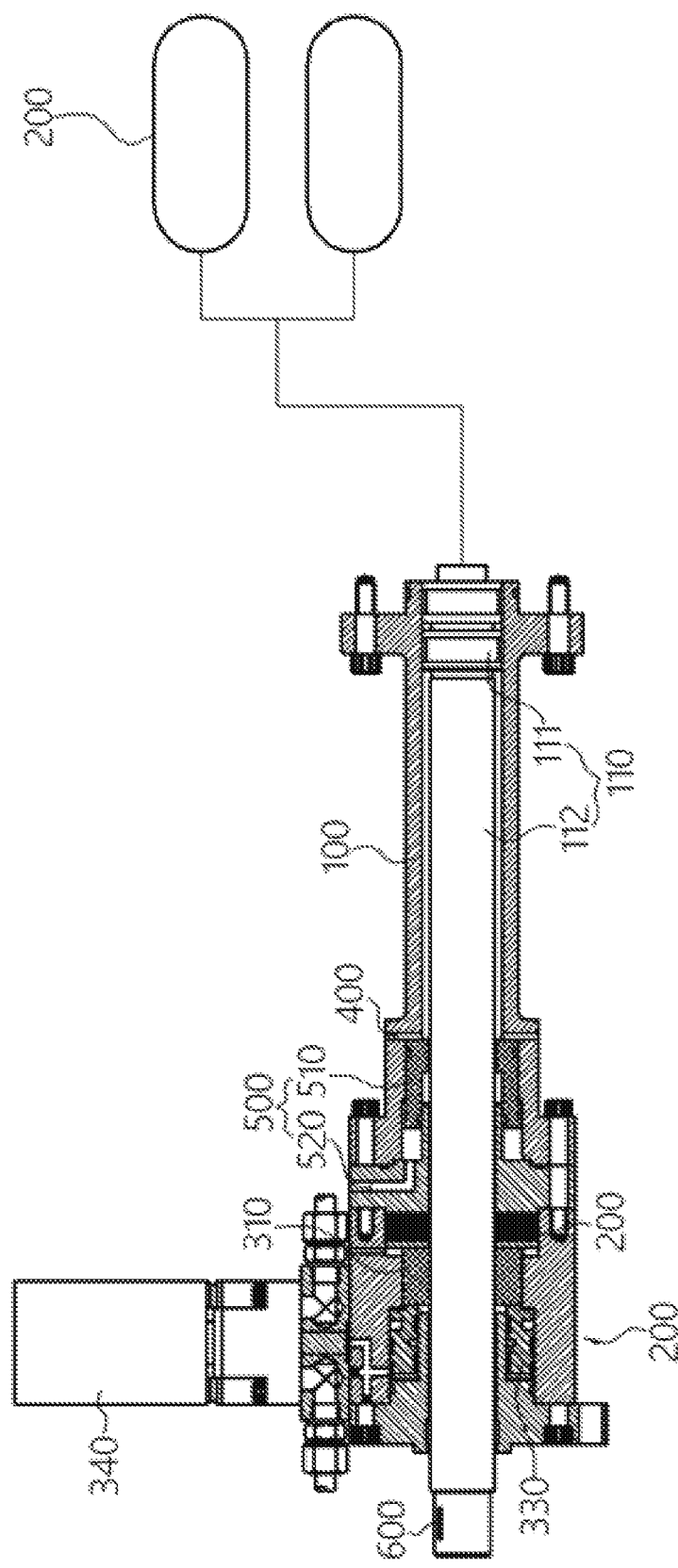
FIG. 12 is a diagram illustrating a fourth example of the hybrid servo actuator for a crash test according to the exemplary embodiment of the present invention.

That is, as illustrated in FIG. 12, the chamber 300 of the hybrid servo actuator 1000 for a crash test according to the exemplary embodiment of the present invention may be installed at the upper portion or the lower portion of the body 100 and may be relatively remotely formed therefrom and at least one chamber 300 may be installed according to the test conditions and objects for simulation.

In this case, the chamber 300 and the body 100 are preferably connected to each other by a pipe made of a flexible material but are not limited thereto.

As described above, when the hybrid servo actuator 1000 for a crash test according to the exemplary embodiment of the present invention is configured to include the separately installed chamber 300, the chamber may be free from the restriction of the mounting position and the chamber 300 is configured in at least one or in plural to reduce a diameter of the chamber 300 and thus may be free from the restriction of an installation height of the chamber 300.

Of course, the formation position of the chamber 300 and the number of chambers 300 may be various according to the test conditions and the features of the targeted vehicle and therefore may not be limited.

As illustrated in FIGS. 2, 3, 6 and 7, in the hybrid servo actuator 1000 for a crash test according to the exemplary embodiment of the present invention, one end of the rod 220 may be further provided with an accelerator measurement sensor 700.

The accelerator measurement sensor 700 may measure an operation speed of the operating part 200 of the hybrid servo actuator 1000 for a crash test according to the exemplary embodiment of the present invention, thereby performing the accurate crash test and preventing the safety accident at the time of the operation of the actuator.

Further, if the crash test of the operating part 200 is not hindered, the sensor required for the crash test may be attached in addition to the above-mentioned accelerator measurement sensor 700 and therefore as the attachment provided at one end of the rod 220, various attachments may be possible without being limited to the above-mentioned accelerator measurement sensor 700.

According to the hybrid servo actuator for a crash test according to the exemplary embodiments of the present invention, the actuator used for the crash test is integrally formed with the operating part including the piston and the rod, the chamber supplying the high air pressure (350 bar) to the operating part, and the controller controlling the movement of the operating part, thereby more increasing the moving speed in the stroke direction of the operating part than the general hydraulic cylinder and pneumatic cylinder.

In particular, according to the hybrid servo actuator for a crash test according to the exemplary embodiments of the present invention, the actuator used for the crash test includes the oil pressure cushion type cushion part provided therein to absorb the shock generated by the shock of the operating part even at the time of the malfunction of the operating part and discharge the oil pressure generated by the shock to the outside and thus may be used semi-permanently, thereby preventing the financial and temporal losses.

According to the hybrid servo actuator for a crash test according to the exemplary embodiments of the present invention, the controller for controlling the movement of the operating part is formed at the selected position and performs the control using the servo-valve, thereby smoothing the braking of the operating part moving at a rapid speed.

According to the hybrid servo actuator for a crash test according to the exemplary embodiments of the present invention, it is possible to smooth the braking of the operating part moving at a more rapid speed than the hydraulic braking method by braking the movement of the operating part based on the method for contacting a control pad of a controller with a rod.

According to the hybrid servo actuator for a crash test according to the exemplary embodiments of the present invention, the piston of the operating part is formed as the aerodynamic bearing to prevent the direct friction even at the time of the movement of the operating part in the stroke direction, thereby reducing the friction force and increasing the wear resistance.

What is claimed is:

1. A hybrid servo actuator for a test crash as a stroke driving actuator, comprising: an operating part configured to include a piston which is provided to move in a hollow formed in a stroke direction inside a body and a rod which is connected to the piston to protrude in one direction of the body; a chamber configured to be formed at the other side of the body and supply an air pressure to the operating part; a controller configured to be formed at one side of the body to enclose the hollow and control a movement of the operating part; and wherein the piston is an aero dynamic bearing and the aero dynamic bearing includes: a bearing body configured to include a bearing hollow formed to enclose the rod; a plurality of air grooves configured to be formed on an outer circumferential surface of the bearing body in a circumferential direction; a plurality of air holes configured to be formed on one side of the bearing body; and a guide pipe configured to guide the air pressure introduced into the air holes to the air grooves.

2. The hybrid servo actuator of claim 1, wherein the controller includes:
   a control pad configured to be formed to contact an outer circumferential surface of the rod and control an operation of the operating part;
   a fixed controller configured to be formed at one side of the control pad and fix the control pad by an oil pressure;
   an operation controller configured to be formed at the other side of the control pad and push the control pad in the direction of the fixed controller by the oil pressure to allow the control pad to separate from the rod so as to release the rod control an operation of the control pad by the oil pressure; and
   a braking release controller configured to supply the oil pressure to control an operation of the controller.

3. The hybrid servo actuator of claim 2, wherein the braking release controller supplies an oil pressure larger than that of the fixed controller to the operation controller to release the control pad from the rod.

4. The hybrid servo actuator of claim 2, wherein the fixed controller has a spring shape and fixes the control pad by elasticity.

5. The hybrid servo actuator of claim 4, wherein the braking release controller supplies an oil pressure larger than the elasticity of the fixed controller to the operation controller to release the control pad from the rod.

6. The hybrid servo actuator of claim 1, further comprising:
   a reverse pneumatic supplier configured to be formed at an end in a stroke advancing direction of the piston to supply the air pressure to the hollow.

7. The hybrid servo actuator of claim 1, further comprising:
   a cushion part configured to be formed on a front surface of the controller in the stroke direction of the piston to absorb a shock of the piston.

8. The hybrid servo actuator of claim 7, wherein the cushion part includes:
   a cushion piston configured to prevent the piston from being advanced in the stroke direction; and
   a cushion valve configured to be connected to the cushion piston to discharge an oil pressure to the outside.

9. The hybrid servo actuator of claim 1, wherein the operating part further includes an accelerator measurement sensor configured to be formed at an end of the rod.

* * * * *